United States Patent
Lopez et al.

(10) Patent No.: US 12,418,904 B2
(45) Date of Patent: *Sep. 16, 2025

(54) TRANSMITTING AND RECEIVING SIGNALS USING MULTIPLE CARRIERS FROM MULTIPLE ANTENNA

(71) Applicant: Telefonaktiebolaget LM Ericsson (publ), Stockholm (SE)

(72) Inventors: Miguel Lopez, Aachen (DE); Dennis Sundman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,553

(22) Filed: May 24, 2024

(65) Prior Publication Data

US 2024/0314757 A1 Sep. 19, 2024

Related U.S. Application Data

(63) Continuation of application No. 17/264,047, filed as application No. PCT/EP2018/071678 on Aug. 9, 2018, now Pat. No. 11,997,661.

(51) Int. Cl.
*H04W 72/0453* (2023.01)
*H04B 7/0413* (2017.01)
*H04L 5/00* (2006.01)

(52) U.S. Cl.
CPC ...... *H04W 72/0453* (2013.01); *H04B 7/0413* (2013.01); *H04L 5/0044* (2013.01)

(58) Field of Classification Search
CPC . H04W 72/0453; H04B 7/0413; H04B 7/068; H04L 5/0044; H04L 1/0606
See application file for complete search history.

(56) References Cited

U.S. PATENT DOCUMENTS

| | | |
|---|---|---|
| 7,782,970 B2 | 8/2010 | Shao et al. |
| 8,605,811 B2 | 12/2013 | Yang |
| 11,683,139 B2 | 6/2023 | Grant et al. |
| (Continued) | | |

FOREIGN PATENT DOCUMENTS

| | | |
|---|---|---|
| CN | 101997650 A | 3/2011 |
| CO | 2019003681 A2 | 4/2019 |
| (Continued) | | |

OTHER PUBLICATIONS

Wu, T. et al., "BCC Interleaver Parameters for DCM", May 16, 2016, pp. 1-23, IEEE 802.11-16/0621, IEEE.

(Continued)

*Primary Examiner* — Tejis Daya
(74) *Attorney, Agent, or Firm* — COATS & BENNETT, PLLC (57) ABSTRACT

In one example aspect, a method of transmitting signals is provided, the method comprising transmitting signals using one or more first subcarriers only from a first antenna, wherein the signals transmitted from the first antenna comprise first signals based on data, and transmitting signals using one or more second subcarriers different from the one or more first subcarriers only from a second antenna, wherein the signals transmitted from the second antenna comprise second signals based on the data.

19 Claims, 5 Drawing Sheets

(56) References Cited

U.S. PATENT DOCUMENTS

| | | |
|---|---|---|
| 2003/0144033 A1 | 7/2003 | Sumasu |
| 2004/0258174 A1 | 12/2004 | Shao et al. |
| 2005/0128993 A1 | 6/2005 | Yu et al. |
| 2005/0141407 A1 | 6/2005 | Sandhu |
| 2006/0008028 A1* | 1/2006 | Maltsev .............. H03F 3/24 375/297 |
| 2006/0035605 A1* | 2/2006 | Ozluturk ............. H04B 7/10 455/101 |
| 2006/0171353 A1* | 8/2006 | Nagata ............ H04L 27/2601 370/445 |
| 2006/0246853 A1* | 11/2006 | Nakao .............. H04B 7/0619 455/562.1 |
| 2006/0250938 A1* | 11/2006 | Khan ............... H04B 7/0697 370/208 |
| 2007/0071067 A1* | 3/2007 | Kwong ............. H04L 1/0071 375/130 |
| 2008/0062857 A1 | 3/2008 | Monogioudis et al. |
| 2009/0245397 A1* | 10/2009 | Moffatt ............. G06F 17/142 375/260 |
| 2010/0074305 A1* | 3/2010 | Lee ................. H04L 5/0023 375/135 |
| 2013/0016694 A1* | 1/2013 | Nimbalker .......... H04L 1/0016 370/330 |
| 2013/0148644 A1* | 6/2013 | Suh ................. H04B 7/0689 370/338 |
| 2017/0195108 A1 | 7/2017 | Liu |
| 2017/0310000 A1 | 10/2017 | Gustavsson et al. |
| 2018/0049162 A1* | 2/2018 | Patil ................. H04W 72/56 |
| 2018/0091271 A1* | 3/2018 | Gong ............... H04L 27/2605 |
| 2021/0410177 A1 | 12/2021 | Takeda et al. |

FOREIGN PATENT DOCUMENTS

| | | |
|---|---|---|
| JP | 2002344415 A | 11/2002 |
| JP | 2006519520 A | 8/2006 |
| WO | 2018104914 A1 | 6/2018 |

OTHER PUBLICATIONS

Lomayev, A. et al., "Performance Comparison for Dual Carrier and Regular Modulations for SU-MIMO in 11ay", May 16, 2016, IEEE 802.11-16/0631r1, IEEE.

Sybis, M. et al., "Channel Coding for Ultra-Reliable Low-Latency Communication in 5G Systems", 2016 IEEE 84th Vehicular Technology Conference (VTC-Fall), Sep. 18, 2016, pp. 1-5, IEEE.

Perahia, E. et al., "Next Generation Wireless LANS: Throughput, Robustness, and Reliability in 802.11n", Jan. 1, 2008, pp. 1-385, Cambridge.

Luvisotto, M. et al., "Ultra High Performance Wireless Control for Critical Applications: Challenges and Directions", IEEE Transactions on Industrial Informatics, vol. 13 No. 3, Jun. 1, 2017, pp. 1448-1459, IEEE.

Shao, L. et al., "Rate-One Space Frequency Block Codes with Maximum Diversity Gain for MIMO-OFDM", GLOBECOM 2003. IEEE Global Telecommunications Conference (IEEE Cat. No.03CH37489), Dec. 1, 2003, pp. 809-813, IEEE.

Durisi, G. et al., "Toward Massive, Ultrareliable, and Low-Latency Wireless Communication with Short Packets", Proceedings of the IEEE, vol. 104 No. 9, Sep. 2016, pp. 1711-1726, IEEE.

* cited by examiner

TRANSMITTING AND RECEIVING SIGNALS USING MULTIPLE CARRIERS FROM MULTIPLE ANTENNA

RELATED APPLICATIONS

The present application is a continuation of U.S. patent application Ser. No. 17/264,047 filed Jan. 28, 2021, which is a national stage application of PCT/EP2018/071678, filed Aug. 9, 2018, the disclosures of each of which are incorporated herein by reference in their entirety.

TECHNICAL FIELD

Examples of the present disclosure relate to transmitting and receiving signals, for example in multi-antenna systems.

BACKGROUND

Some applications of wireless communications may require low latency and/or high reliability. For example, some applications of ultra-reliable low latency communications (URLLC) may require one or more of small packet sizes, low latency and high reliability (e.g. low packet error rate, PER). Diversity techniques can be helpful in achieving high reliability.

In multi-antenna wireless systems (e.g. multiple-input multiple-output, MIMO), spatial degrees of freedom can be employed to increase either the multiplexing gain or the diversity gain, but there is a fundamental tradeoff between the two gains, and it may not be possible to optimize them both simultaneously.

SUMMARY

One aspect of the present disclosure provides a method of transmitting signals. The method comprises transmitting signals using one or more first subcarriers only from a first antenna, wherein the signals transmitted from the first antenna comprise first signals based on data. The method also comprises transmitting signals using one or more second subcarriers different from the one or more first subcarriers only from a second antenna, wherein the signals transmitted from the second antenna comprise second signals based on the data.

Another aspect of the present disclosure provides a method of receiving signals. The method comprises receiving, at a first reception antenna, signals transmitted using one or more first subcarriers only from a first transmission antenna, wherein the signals transmitted from the first transmission antenna comprise first signals based on data. The method also comprises receiving, at the first reception antenna, signals transmitted using one or more second subcarriers different from the one or more first subcarriers only from a second transmission antenna, wherein the signals transmitted from the second transmission antenna comprise second signals based on the data.

A further aspect of the present disclosure provides apparatus for transmitting signals. The apparatus comprises a processor and a memory. The memory contains instructions executable by the processor such that the apparatus is operable to transmit signals using one or more first subcarriers only from a first antenna, wherein the signals transmitted from the first antenna comprise first signals based on data, and transmit signals using one or more second subcarriers different from the one or more first subcarriers only from a second antenna, wherein the signals transmitted from the second antenna comprise second signals based on the data.

A still further aspect of the present disclosure provides apparatus for receiving signals. The apparatus comprises a processor and a memory. The memory contains instructions executable by the processor such that the apparatus is operable to receive, at a first reception antenna, signals transmitted using one or more first subcarriers only from a first transmission antenna, wherein the signals transmitted from the first transmission antenna comprise first signals based on data, and receive, at the first reception antenna, signals transmitted using one or more second subcarriers different from the one or more first subcarriers only from a second transmission antenna, wherein the signals transmitted from the second transmission antenna comprise second signals based on the data.

An additional aspect of the present disclosure provides apparatus for transmitting signals. The apparatus is configured to transmit signals using one or more first subcarriers only from a first antenna, wherein the signals transmitted from the first antenna comprise first signals based on data and transmit signals using one or more second subcarriers different from the one or more first subcarriers only from a second antenna, wherein the signals transmitted from the second antenna comprise second signals based on the data.

Another aspect of the present disclosure provides apparatus for receiving signals. The apparatus is configured to receive, at a first reception antenna, signals transmitted using one or more first subcarriers only from a first transmission antenna, wherein the signals transmitted from the first transmission antenna comprise first signals based on data, and receive, at the first reception antenna, signals transmitted using one or more second subcarriers different from the one or more first subcarriers only from a second transmission antenna, wherein the signals transmitted from the second transmission antenna comprise second signals based on the data.

A further aspect of the present disclosure provides apparatus for transmitting signals. The apparatus comprises a first transmitting module configured to transmit signals using one or more first subcarriers only from a first antenna, wherein the signals transmitted from the first antenna comprise first signals based on data. The apparatus also comprises a second transmitting module configured to transmit signals using one or more second subcarriers different from the one or more first subcarriers only from a second antenna, wherein the signals transmitted from the second antenna comprise second signals based on the data.

A still further aspect of the present disclosure provides apparatus for receiving signals. The apparatus comprises a first receiving module configured to receive, at a first reception antenna, signals transmitted using one or more first subcarriers only from a first transmission antenna, wherein the signals transmitted from the first transmission antenna comprise first signals based on data. The apparatus also comprises a second receiving module configured to receive, at the first reception antenna, signals transmitted using one or more second subcarriers different from the one or more first subcarriers only from a second transmission antenna, wherein the signals transmitted from the second transmission antenna comprise second signals based on the data.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Examples of the present disclosure provide a communication system whereby data is sent using multiple carriers from multiple antennas. However, a particular subcarrier is only sent from one antenna. Therefore, in some examples, signals transmitted from different antennas can be considered as orthogonal, where orthogonal subcarriers are used. In some cases, the communication system may be considered as multiple single-input single-output (SISO) or single-input multiple-output (SIMO) systems, which may reduce overhead and/or processing complexity compared to a MIMO system. Furthermore, in some examples, as not all subcarriers are transmitted from a single antenna, signals transmitted from a single antenna can be increased in power without increasing the overall power transmitted using all available subcarriers from a single antenna.

Figure 1:
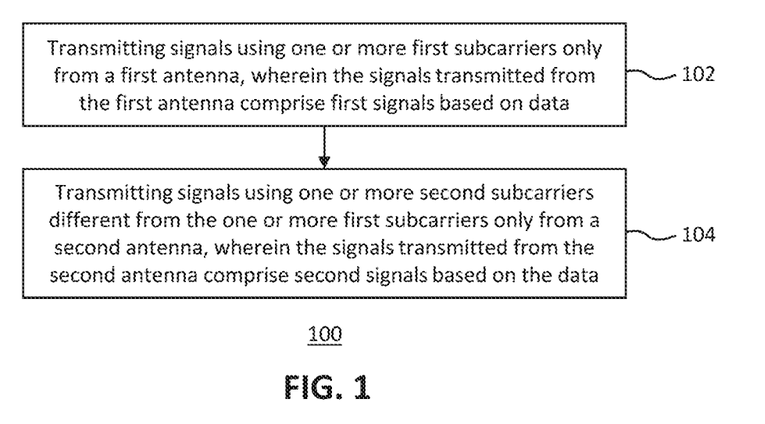
FIG. 1 is a flow chart of an example of a method of transmitting signals.

FIG. 1 is a flow chart of an example of a method 100 of transmitting signals. The method 100 comprises, in step 102, transmitting signals using one or more first subcarriers only from a first antenna, wherein the signals transmitted from the first antenna comprise first signals based on data. Step 104 of the method comprises transmitting signals using one or more second subcarriers different from the one or more first subcarriers only from a second antenna, wherein the signals transmitted from the second antenna comprise second signals based on the data. The signals transmitted from the second antenna may for example be transmitted simultaneously with the signals transmitted from the first antenna.

Therefore, for example, where a transmitter or a transmission system includes multiple antennas, a signal is transmitted only from one of those antennas, and not from any of the other antennas (e.g. the method 100 comprises refraining from transmitting signals using the one or more second subcarriers from the first antenna, and/or refraining from transmitting signals using the one or more first subcarriers from the second antenna). Signals transmitted from a particular antenna may in some examples comprise multiple subcarriers that are not transmitted from any of the other antennas.

The signals from each antenna are based on the data. That is, for example, the same data may be used to form signals transmitted from each antenna. However, different modulation schemes, coding schemes, interleaving schemes, scrambling schemes, encryption schemes and/or any other data manipulation schemes may be used for different antennas in some examples, though in other examples one or more of the same schemes may be used across the antennas.

Figure 2:
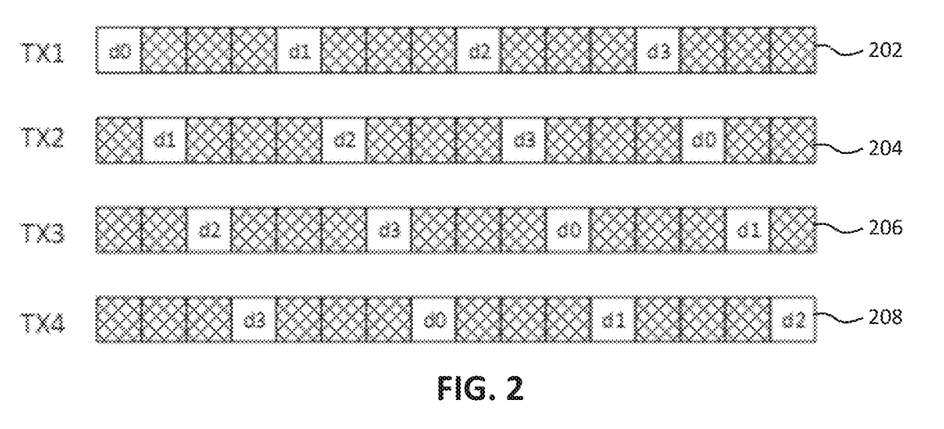
FIG. 2 shows an example of signals transmitted simultaneously from a transmission system.

FIG. 2 shows an example of signals transmitted simultaneously from a transmission system that includes four antennas. Signals 202 are transmitted from a first antenna TX1. Signals 204 are transmitted from a second antenna TX2. Signals 206 are transmitted from a third antenna TX3. Signals 208 are transmitted from a fourth antenna TX4. Each block represents a particular subcarrier, with blocks representing the same subcarrier arranged vertically. A shaded block indicates that no signal is transmitted from that subcarrier from that antenna. The signals transmitted from each antenna are based on data comprising groups of one or more bits d0, d1, d2 and d3. In FIG. 2, a block containing one of these indicates that a signal based on that group of one or more bits is transmitted from that subcarrier from that antenna.

For example, a signal based on bits d0 is transmitted from a first subcarrier only from antenna TX1. A signal on the next subcarrier, adjacent to the first subcarrier, is transmitted only from TX2 based on bits d1. A signal on the next subcarrier is transmitted only from TX3 based on bits d2. A signal on the next subcarrier is transmitted only from TX4 based on bits d3. A signal on the next subcarrier is transmitted only from TX1 based on bits d1, and so on. In the example shown, transmitting signals based on the same data from different antennas may provide spatial diversity, whereas transmitting signals based on the same group of bits from different subcarriers (which are transmitted on different antennas) may provide frequency and/or spatial diversity. In the example shown, signals on adjacent subcarriers are not based on the same group of one or more bits, which may provide further frequency diversity. In the example shown, from each antenna, signals based on the data are transmitted on four out of sixteen available subcarriers, while no signal is transmitted on the remaining twelve subcarriers from that antenna. Therefore, compared to a transmission system where signals are transmitted on all subcarriers from an antenna, the signals transmitted from each antenna can be increased in power by a factor of four without increasing the overall transmission power.

In other examples, there may be any number of two or more transmit antennas, there may be any number of subcarriers, and the signals from each antenna may be on any subcarrier and based on any bits of the data. The subcarriers may in some examples be orthogonal.

In some examples, the data comprises one or more data portions (e.g. one or more groups of one or more bits) and transmitting the signals from the first and second antennas comprises, for each data portion, transmitting at least one first symbol using a respective one of the one or more first subcarriers from the first antenna, and transmitting at least one second symbol using a respective one of the one or more second subcarriers from the second antenna. Therefore, for example, each data portion can be mapped to a respective subcarrier from each transmit antenna. In some examples, for each data portion, the respective one of the one or more first subcarriers and the respective one of the one or more second subcarriers are non-adjacent. This may provide frequency diversity, as interference affecting adjacent subcarriers may not affect signals based on the same data portion. In some examples, the at least one first symbol and the at least one second symbol are identical, whereas in other examples they may be different (e.g. where there is a different mapping of data portions to symbols between different antennas).

In some examples, the method 100 comprises transmitting signals from one or more further antennas, wherein, for each further antenna, transmitting signals from the further antenna comprises transmitting signals using respective one or more further subcarriers only from the further antenna, wherein the signals transmitted from the further antenna comprise second signals based on the data, and wherein the respective one or more further subcarriers are different from the one or more first subcarriers and the one or more second subcarriers. Thus, there may be two, three, four or more transmit antennas, each transmitting signals using subcarriers unique to that antenna.

In some examples, the method 100 comprises encoding the data and mapping portions of the encoded data to first symbols according to a first modulation scheme. The method 100 also comprises performing an inverse discrete Fourier transform on the first symbols to form the first signals, mapping portions of the encoded data to second symbols according to a second modulation scheme, and performing an inverse discrete Fourier transform on the second symbols to form the second signals. In such examples, the same encoding scheme may be used to transmit signals from each of the antennas based on the data, whereas the modulation schemes may be different between antennas or may be the same. In some examples, the method comprises interleaving the data or the symbols. This may provide frequency and/or time diversity.

In some examples, the method comprises forming the first signals by encoding portions of the data according to a first encoding scheme to form first encoded data, mapping the first encoded data to first symbols according to a first modulation scheme, and performing an inverse discrete Fourier transform and multiplication by a complex waveform on the first symbols to form the first signals. The method 100 also comprises forming the second signals by encoding portions of the data according to a second encoding scheme to form second encoded data, mapping the second encoded data to second symbols according to a second modulation scheme, and performing an inverse discrete Fourier transform and multiplication by a complex waveform on the second symbols to form the first signals. Thus, signals transmitted from different antennas can be formed using a respective modulation and encoding scheme, that may be the same as or different from a modulation and encoding scheme used to form signals transmitted from other antennas.

In some examples, the first modulation scheme is different from the second modulation scheme, though in other examples the modulation schemes may be the same.

In some examples, the data comprises a training field (e.g. long training field, LTF) and a data field. The training field may for example be used by a receiver to measure characteristics of the channel between a particular transmit antenna and a receiver. In some examples, because each subcarrier is only transmitted from a single antenna, only one training field may be transmitted in each cycle. Other transmission schemes such as MIMO or MISO that transmit using the same subcarrier simultaneously from multiple antennas may for example require more training fields to be transmitted (e.g. one per transmit antenna, non-simultaneously), or may spread the LTF using orthogonal cover codes.

Figure 3:
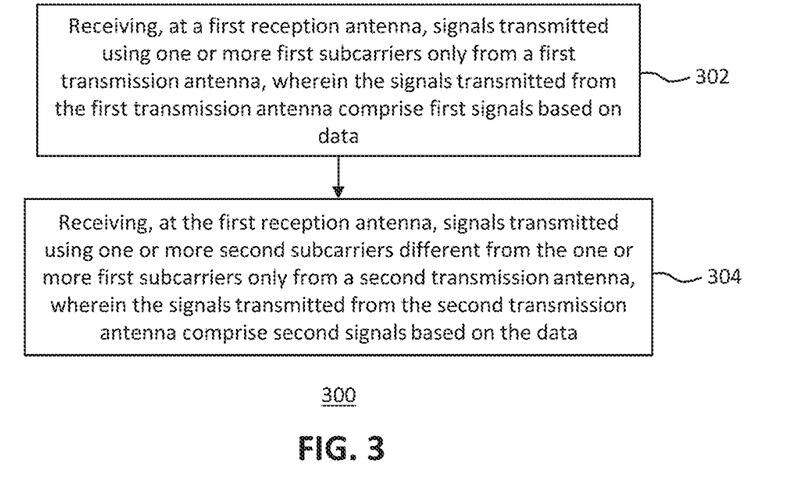
FIG. 3 shows an example of a method of receiving signals.

FIG. 3 shows an example of a method 300 of receiving signals. For example, the signals may be transmitted according to the method 100 described above with reference to FIGS. 1 and 2. The method 300 comprises, in step 302, receiving, at a first reception antenna, signals transmitted using one or more first subcarriers only from a first transmission antenna, wherein the signals transmitted from the first transmission antenna comprise first signals based on data. The method 300 also comprises, in step 304, receiving, at the first reception antenna, signals transmitted using one or more second subcarriers different from the one or more first subcarriers only from a second transmission antenna, wherein the signals transmitted from the second transmission antenna comprise second signals based on the data.

Therefore, for example, signals received at the first antenna on a particular subcarrier are received from only one of the transmit antennas. The method 300 may therefore comprise for example receiving no signals transmitted from the first transmission antenna on the one or more second subcarriers, and/or receiving no signals transmitted from the second transmission antenna on the one or more first subcarriers.

In some examples, the signals received at the first reception antenna can be considered as a plurality of single-input single-output (SISO) signals and processed accordingly (e.g. channel estimation and/or equalization). In some examples, where there are multiple reception antennas, the signals received at the multiple reception antennas can be considered as a plurality of single-input multiple-output (SIMO) signals and processed accordingly.

The received signals may be transmitted from any number of two or more antennas. Therefore, in some examples, the method 300 comprises receiving signals transmitted from one or more further transmission antennas, wherein, for each further transmission antenna, receiving signals transmitted from the further transmission antenna comprises receiving signals transmitted using respective one or more further subcarriers only from the further transmission antenna. The signals transmitted from the further transmission antenna comprise second signals based on the data, and wherein the respective one or more further subcarriers are different from the one or more first subcarriers and the one or more second subcarriers.

The signals received on each subcarrier may be demodulated and/or decoded accordingly. The demodulation and/or decoding scheme may differ between subcarriers (e.g. if the subcarriers were transmitted from different antennas) or may be the same between subcarriers.

Particular examples and embodiments will now be described below.

Examples of the present disclosure may provide Spatial Multiple Carrier Modulation (SMCM), transmitting a subcarrier only from a particular antenna, that may provide diversity gains when both the transmitter and receiver possess multiple antennas. Traditionally, good link budget and multiple antennas may be used to increase the communication speed. In contrast, SMCM utilizes a good link budget and multiple antennas to increase diversity (which can in turn be used to provide high reliability). It differs from for example multiple-input multiple-output dual-carrier modulation (MIMO-DCM) in several respects.

Firstly, SMCM may require less overhead, because only one long training field (LTF) may be used regardless of the number of spatial streams. With URLLC, which may have short packets consisting of as little as one OFDM data symbol, this difference can have a substantial impact in the overall number of users that can be supported.

Secondly, the receiver algorithms may have lower complexity than the corresponding algorithms for MIMO-DCM. This can be an advantage particularly in low end devices with limited processing capabilities.

Thirdly, in MIMO-DCM the data is duplicated, while the constellation order is also increased. However, the power in each subcarrier is kept constant. In embodiments described herein, the data may be duplicated and the constellation order may also be increased, but a duplication of the data may be accompanied by a halving of the number of non-zero sub-carriers, which in turn may allow a 3 dB boost of the power of each non-zero subcarrier without an increase in the total transmit power.

Figure 4:
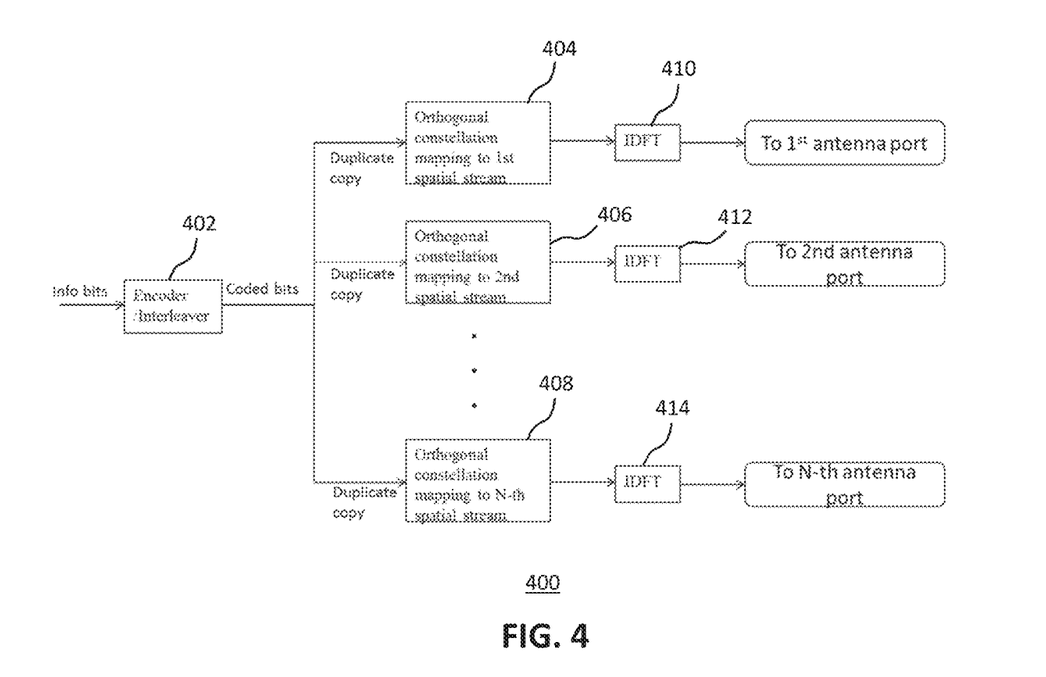
FIG. 4 shows an example of a transmitter.

FIG. 4 shows an example of a SMCM transmitter 400 that includes N transmit antennas. Data bits are provided to encoder/interleaver block 402 that encodes and interleaves the data bits. The encoded and interleaved data is provided to orthogonal constellation mappers 404, 406, 408, each mapper associated with a respective one of the transmit antennas. The mappers 404, 406, 408 may allocate orthogonal sub-carriers to the respective spatial streams to be transmitted from each antenna. That is, for example, the set of used sub-carriers in any given spatial stream are orthogonal to the set of used sub-carriers used in any other stream. The frequency domain symbols may also be shifted or interleaved in order to exploit frequency diversity. The output of each mapper 404, 406, 408 is provided to a respective inverse discrete Fourier transform (IDFT) block 410, 412, 414, and the output of each IDFT block is provided to a respective transmit antenna.

Figure 5:
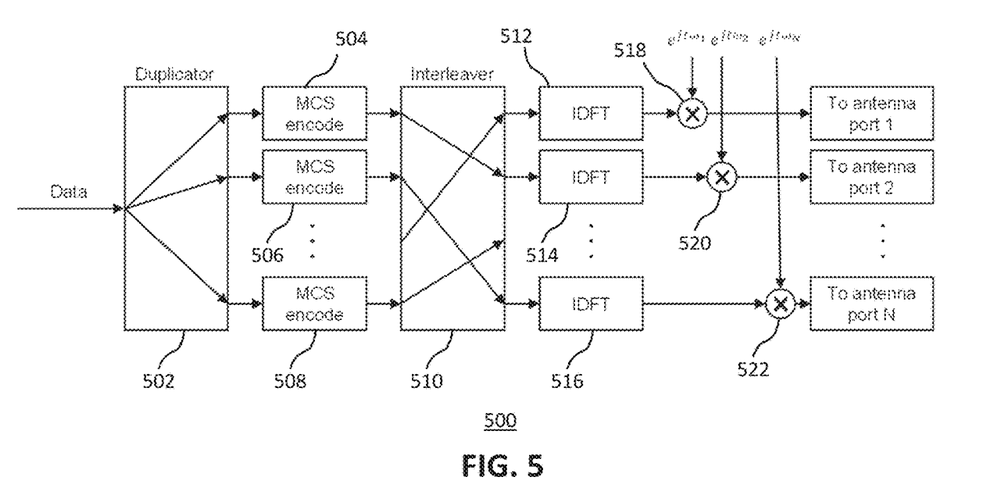
FIG. 5 shows an example of a transmitter.

FIG. 5 shows an example of another SMCM transmitter 500 that includes N transmit antennas. Data is provided to a duplicator 502 that duplicates the data and provides the data to respective modulation and coding (MCS encode) blocks 504, 506, 508, each associated with a respective transmit antenna. The outputs of the MCS encode blocks 504, 506, 508 may each be interleaved by interleaver 510. Outputs of the interleaver are provided to respective IDFT blocks 512, 514, 516, each associated with a respective transmit antenna. The output of each IDFT block 512, 514, 516 is provided to a respective multiplier 518, 520, 522 and multiplied by a complex waveform, in this example $e^{j\omega_x}$, x=1, . . . , N. The outputs of the multipliers 518, 520, 522 are provided to respective transmit antennas.

There are two particular differences of the transmitter 500 of FIG. 5 compared to the transmitter 400 of FIG. 4. The first difference is that the encoding is now performed on each copy of the data from the duplicator 502 individually, allowing a scheme where different coding rates (and/or modulation orders) can be used on different subcarriers. The second difference is that the IDFT may not be performed over the full band, but just for the active part of the band. For example, if there are 64 subcarriers and four antenna ports, four IDFTs of size 16 can be used. The resulting signals are then converted to the appropriate part of the band by a multiplication with a complex waveform at multipliers 518, 520, 522.

As an example, an OFDM system may have sixteen active/available subcarriers and 32 code bits per OFDM symbol. The payload can be mapped to sixteen QPSK constellation symbols, which modulate the phase of each of the active subcarriers. Spatial expansion can be used to map the OFDM symbols to four transmitters. According to examples of the present disclosure, diversity can be increased by mapping the payload to four 256-QAM symbols, such as for example denoted d0 to d3 in FIG. 2, if the groups of bits d0, d1, d2 and d3 are 256-QAM symbols for example. Since there are four used and twelve muted sub-carriers in each transmitter chain, the power of the frequency domain symbols can be boosted by a factor of four (6 dB) from each antenna, while keeping the total transmitted power equal to that of the OFDM system. In addition, since the symbols d0 to d3 are repeated four times, coherent combining at the receiver may result in a 6 dB processing gain. In summary, the combined effect of the power boost and the processing gain may result in an increase of SNR at the receiver but may not result in packet error rate (PER) reduction when compared to a prior art system, since the constellation order is also increased. This is due to the fact that higher order constellations operate at higher SNR than lower order constellations. In this example, the power boost gives a 6 dB SNR gain, while the repetition yields another 6 dB in processing gain, resulting in a total SNR gain of 12 dB. However, in many wireless systems, 256-QAM typically has an operating SNR that is around 18 dB higher than the operating SNR of QPSK, so that there may not be noticeable differences in PER due to the SNR. Rather, the main advantages of examples of the present disclosure may include gains in diversity and/or low overhead, and/or low TX/RX complexity when compared to prior art systems. In this example, a SISO system using spatial expansion may exhibit less diversity than examples of the present disclosure, because it may not exploit all the spatial degrees of freedom available. Examples of this disclosure, with a larger diversity gain, may result a smaller outage probability, which is a desirable property in for example URLLC. On the other hand, a MIMO system could exploit all the spatial degrees of freedom available but would require considerably more training or pilot overhead. In addition, such a MIMO system may require more advanced receivers. While the overhead can be negligible in some wireless broadband applications, it can be significant in URLLC or Industrial IoT applications when data payloads are small. In such circumstances, embodiments of this disclosure may result in lower latency and/or higher system capacity.

SIMO receiver algorithms (SIMO channel estimation, SIMO equalization) may also be employed at a receiver. This is a consequence of the spatial streams being orthogonal in the frequency domain. As an illustrative example, a transmitter may transmit signals from four antennas, similar to as shown in FIG. 2, and a receiver may have two receive antennas. The received signals, corresponding to subcarrier number n, are $y_1(n)$ and $y_2(n)$. The channel between transmit antenna m and receive antenna k is $h_{km}(n)$, and $w_k(n)$ are noise samples. Suppose that it is desired to estimate the transmitted symbol d0 (where d0, d1, d2 and d3 represent transmitted symbols). d0 is transmitted in subcarriers numbers 1, 8, 11 and 14. Hence, the following model describes the received signals containing the symbol d0.

$$\begin{bmatrix} y_1(1) \\ y_2(1) \end{bmatrix} = \begin{bmatrix} h_{11}(1) \\ h_{21}(1) \end{bmatrix} d0 + \begin{bmatrix} w_1(1) \\ w_2(1) \end{bmatrix},$$

$$\begin{bmatrix} y_1(8) \\ y_2(8) \end{bmatrix} = \begin{bmatrix} h_{14}(8) \\ h_{24}(8) \end{bmatrix} d0 + \begin{bmatrix} w_1(8) \\ w_2(8) \end{bmatrix},$$

$$\begin{bmatrix} y_1(11) \\ y_2(11) \end{bmatrix} = \begin{bmatrix} h_{13}(11) \\ h_{23}(11) \end{bmatrix} d0 + \begin{bmatrix} w_1(11) \\ w_2(11) \end{bmatrix},$$

$$\begin{bmatrix} y_1(14) \\ y_2(14) \end{bmatrix} = \begin{bmatrix} h_{12}(14) \\ h_{22}(14) \end{bmatrix} d0 + \begin{bmatrix} w_1(14) \\ w_2(14) \end{bmatrix}.$$

This is equivalent to 4 parallel 1×2 SIMO systems. Defining $$Y = [y_1(1), y_2(1), y_1(8), y_2(8), y_1(11), y_2(11), y_1(14), y_2(14)]^T$$

and $$H = [h_{11}(1), h_{11}(1), h_{14}(8), h_{24}(8), h_{13}(11), h_{23}(11), h_{12}(14), h_{22}(14)]^T,$$

The model can be rewritten in the form $$Y = H \cdot d0 + W,$$

Where W is a noise vector. An estimate $\widehat{d0}$ of d0 can be obtained using e.g. maximum ratio combining (MRC) processing:

$$\widehat{d0} = \frac{H*}{\|H\|^2} Y.$$

As illustrated in the example shown in FIG. 4, SMCM generates a number of duplicates of the encoded data bits. In examples of SMCM the diversity gain can be tuned by changing one or more of the modulation order, frequency domain interleaving, the code rate and the antenna port mapping.

An example SIMO system may consist of four transmit antennas and receive antennas, employing single layer transmission with spatial expansion. Suppose that a data packet consists of only two OFDM symbols, the first a long training field (LTF) for channel estimation and the second a data symbol. Further, suppose that the payload consists of 120 information bits and that the code rate is ½. With for example 240 active/available subcarriers, the code bits can be mapped to one OFDM data symbol using BPSK frequency domain symbols labeled s(0), . . . , s(239). Since there is only one spatial stream, it can be mapped to the four transmit antenna ports, for example by means of spatial expansion.

According to examples of the present disclosure, the same packet format can be used, comprising one LTF followed by one data symbol. The LTF can be identical to the LTF used in the above described SISO system in some examples, consisting of 240 frequency domain symbols t(0), . . . , t(239). The constellation, frequency domain and spatial mappings can be as follows in some examples.

1. Antenna ports Tx1 and Tx2:
    a. For the LTF, the even numbered frequency domain symbols t(0), t(2), . . . , t(236), t(238) are mapped to subcarriers 1, 3, 5, . . . , 239 (e.g. use only every other subcarrier), and all other subcarriers are muted. Boost the power of frequency domain symbols by a factor of two (e.g. compared to a system that uses all carriers simultaneously). This layer is mapped to the two transmit antenna ports Tx1 and Tx2 by means of spatial expansion.
    b. For the data symbol, use subcarriers 1, 3, 5, . . . , 239 (e.g. use only every other subcarrier), and mute all other subcarriers. The code bits are mapped to 120 QPSK constellation symbols labeled d(0), . . . , d(119). Further, this layer is mapped to the two transmit antenna ports Tx1 and Tx2 by means of spatial expansion. Moreover, the power of the frequency domain symbols is boosted by a factor two.
2. Antenna ports Tx3 and Tx4:
    a. For the LTF, the odd numbered frequency domain symbols t(1), t(3), . . . , t(237), t(239) are mapped to subcarriers 2, 4, 6, . . . , 240 (e.g. use only every other subcarrier), and all other subcarriers are muted. Boost the power of frequency domain symbols by a factor two. This layer is mapped to the two transmit antenna ports Tx3 and Tx4 by means of spatial expansion.
    b. For the data symbol, use subcarriers 2, 4, 6, . . . , 238, 240 (e.g. use only every other subcarrier), and mute all other subcarriers. The code bits are mapped to 120 QPSK constellation symbols labeled d(60), d(61), . . . , d(119), d(0), . . . , d(59), the same symbols transmitted through antenna ports Tx1 and Tx2 but cyclically shifted 60 steps. Further, this layer is mapped to the two transmit antenna ports Tx3 and Tx4 by means of spatial expansion. Moreover, the power of the frequency domain symbols is boosted by a factor two.

The power boost by a factor two does not increase the total transmitted power when compared to the SISO system, since every second subcarrier is muted in each layer.

According to further examples of the present disclosure, the same packet format can be used, comprising one LTF followed by one data symbol. The LTF can be identical to the LTF used in the SISO system in some examples. The constellation, frequency domain and spatial mappings can be as follows in some examples.

1. Antenna port Tx1:
    a. For the LTF, the frequency domain symbols t(0), t(4), . . . , t(232), t(236) are mapped to subcarriers 1, 5, . . . , 237 (e.g. use only every fourth subcarrier), and all other subcarriers are muted. Boost the power of frequency domain symbols by a factor of four. This layer is mapped to the transmit antenna port Tx1.
    b. For the data symbol, use subcarriers 1, 5, . . . , 237 (e.g. use only every fourth subcarrier), and mute all other subcarriers. The code bits are mapped to 60 16-QAM constellation symbols labeled d(0), . . . , d(59). Further, this layer is mapped to transmit antenna port Tx1. Moreover, the power of the frequency domain symbols is boosted by a factor four.

2. Antenna port Tx2:
   a. For the LTF, the frequency domain symbols t(1), t(5), . . . , t(233), t(237) are mapped to subcarriers 2, 6, . . . , 238 (e.g. use only every fourth subcarrier), and all other subcarriers are muted. Boost the power of frequency domain symbols by a factor of four. This layer is mapped to the transmit antenna port Tx2.
   b. For the data symbol, use subcarriers 2, 6, . . . , 238 (e.g. use only every fourth subcarrier), mute all other subcarriers. The code bits are mapped to 60 16-QAM constellation symbols labeled d(45), . . . , d(59), d(0), . . . , d(44), the same symbols transmitted through transmit antenna port Tx1 but cyclically shifted 15 steps. Further, this layer is mapped to transmit antenna port Tx2. Moreover, the power of the frequency domain symbols is boosted by a factor of four.
3. Antenna port Tx3:
   a. For the LTF, the frequency domain symbols t(2), t(6), . . . , t(234), t(238) are mapped to subcarriers 3, 7, . . . , 239 (e.g. use only every fourth subcarrier), and all other subcarriers are muted. Boost the power of frequency domain symbols by a factor of four. This layer is mapped to the transmit antenna port Tx2.
   b. For the data symbol, use subcarriers 3, 7, . . . , 239 (e.g. use only every fourth subcarrier), and mute all other subcarriers. The code bits are mapped to 60 16-QAM constellation symbols labeled d(30), . . . , d(59), d(0), . . . , d(29), the same symbols transmitted through transmit antenna port Tx1 but cyclically shifted 30 steps. Further, this layer is mapped to transmit antenna port Tx3. Moreover, the power of the frequency domain symbols is boosted by a factor of four.
4. Antenna port Tx4:
   a. For the LTF, the frequency domain symbols t(3), t(7), . . . , t(235), t(239) are mapped to subcarriers 4, 8, . . . , 240 (use only every fourth subcarrier), and all other subcarriers are muted. Boost the power of frequency domain symbols by a factor of four. This layer is mapped to the transmit antenna port Tx2.
   b. For the data symbol, use subcarriers 4, 8, . . . , 240 (e.g. use only every fourth subcarrier), mute all other subcarriers. The code bits are mapped to 60 16-QAM constellation symbols labeled d(15), . . . , d(59), d(0), . . . , d(14), the same symbols transmitted through transmit antenna port Tx1 but cyclically shifted 45 steps. Further, this layer is mapped to transmit antenna port Tx4. Moreover, the power of the frequency domain symbols is boosted by a factor of four.

The power boost by a factor of four does not increase the total transmitted power when compared to the SISO system, since every fourth subcarrier is muted in each layer.

Figure 6:
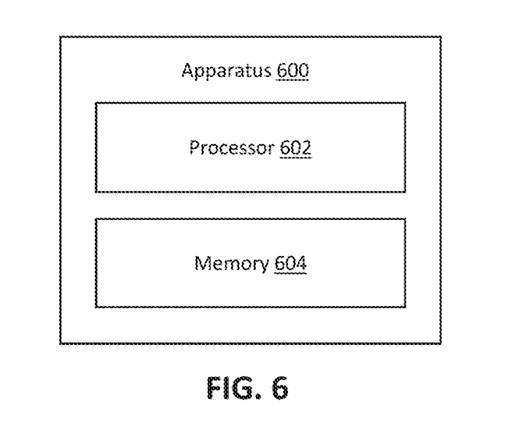
FIG. 6 shows an example of apparatus for transmitting signals.

FIG. 6 shows an example of apparatus 600 for transmitting signals. The apparatus 600 comprises a processor 602 and a memory 604. The memory 604 contains instructions executable by the processor 602 such that the apparatus 600 is operable to transmit signals using one or more first subcarriers only from a first antenna, wherein the signals transmitted from the first antenna comprise first signals based on data, transmit signals using one or more second subcarriers different from the one or more first subcarriers only from a second antenna, wherein the signals transmitted from the second antenna comprise second signals based on the data. In some examples, the apparatus 600 may carry out the method 100 shown in FIG. 1.

Figure 7:
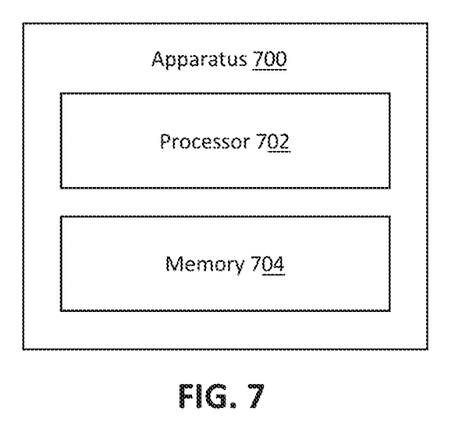
FIG. 7 shows an example of apparatus for receiving signals.

FIG. 7 shows an example of apparatus 700 for receiving signals. The apparatus 700 comprises a processor 702 and a memory 704. The memory 704 contains instructions executable by the processor 702 such that the apparatus 700 is operable to receive, at a first reception antenna, signals transmitted using one or more first subcarriers only from a first transmission antenna, wherein the signals transmitted from the first transmission antenna comprise first signals based on data, and receive, at the first reception antenna, signals transmitted using one or more second subcarriers different from the one or more first subcarriers only from a second transmission antenna, wherein the signals transmitted from the second transmission antenna comprise second signals based on the data. In some examples, the apparatus 700 may carry out the method 300 shown in FIG. 3.

Figure 8:
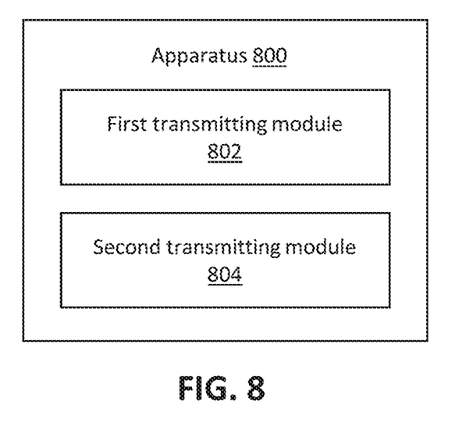
FIG. 8 shows an example of apparatus for transmitting signals.

FIG. 8 shows an example of apparatus 800 for transmitting signals. The apparatus 800 comprises a first transmitting module 802 configured to transmit signals using one or more first subcarriers only from a first antenna, wherein the signals transmitted from the first antenna comprise first signals based on data. The apparatus 800 also comprises a second transmitting module configured to transmit signals using one or more second subcarriers different from the one or more first subcarriers only from a second antenna, wherein the signals transmitted from the second antenna comprise second signals based on the data.

Figure 9:
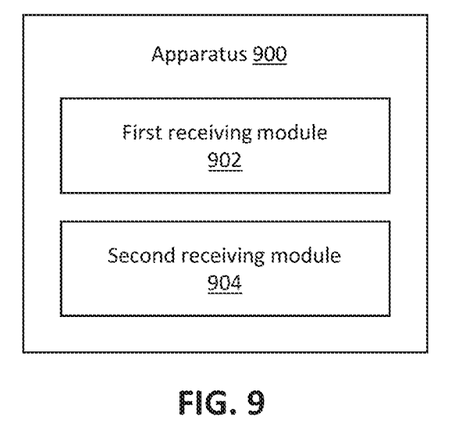
FIG. 9 shows an example of apparatus for receiving signals.

FIG. 9 shows an example of apparatus 900 for receiving signals. The apparatus 900 comprises a first receiving module 902 configured to receive, at a first reception antenna, signals transmitted using one or more first subcarriers only from a first transmission antenna, wherein the signals transmitted from the first transmission antenna comprise first signals based on data. The apparatus 900 also comprises a second receiving module configured to receive, at the first reception antenna, signals transmitted using one or more second subcarriers different from the one or more first subcarriers only from a second transmission antenna, wherein the signals transmitted from the second transmission antenna comprise second signals based on the data.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

What is claimed is:

1. A method of transmitting signals, the method comprising:
   forming first signals based on data by encoding portions of the data according to a first encoding scheme to form first encoded data, mapping the first encoded data to first symbols according to a first modulation scheme, and performing an inverse discrete Fourier transform and multiplication by a complex waveform on the first symbols to form the first signals;

forming second signals based on data by encoding portions of the data according to a second encoding scheme to form second encoded data, mapping the second encoded data to second symbols according to a second modulation scheme, and performing an inverse discrete Fourier transform and multiplication by a complex waveform on the second symbols to form the second signals;

transmitting signals using one or more first subcarriers only from a first antenna, wherein the signals transmitted from the first antenna comprise first signals based on data; and transmitting signals using one or more second subcarriers different from the one or more first subcarriers only from a second antenna, wherein the signals transmitted from the second antenna comprise second signals based on the data;

wherein the data comprises one or more data portions;

wherein the transmitting the signals from the first and second antennas comprises, for each data portion, transmitting at least one first symbol using a respective one of the one or more first subcarriers from the first antenna, and transmitting at least one second symbol using a respective one of the one or more second subcarriers from the second antenna; and wherein the first symbol and the second symbol are identical.

2. The method of claim 1, wherein the method comprises refraining from transmitting signals using the one or more second subcarriers from the first antenna.

3. The method of claim 1, wherein the method comprises refraining from transmitting signals using the one or more first subcarriers from the second antenna.

4. The method of claim 1, wherein, for each data portion, the respective one of the one or more first subcarriers and the respective one of the one or more second subcarriers are non-adjacent.

5. The method of claim 1:
further comprising transmitting signals from one or more further antennas;
wherein, for each further antenna, transmitting signals from the further antenna comprises transmitting signals using respective one or more further subcarriers only from the further antenna;
wherein the signals transmitted from the further antenna comprise second signals based on the data; and
wherein the respective one or more further subcarriers are different from the one or more first subcarriers and the one or more second subcarriers.

6. The method of claim 1, further comprising interleaving the data or the symbols.

7. The method of claim 1, wherein the data comprises a training field and a data field.

8. The method of claim 1, wherein the one or more first subcarriers comprise a first subset of a plurality of orthogonal subcarriers; and wherein the one or more second subcarriers comprise a second subset of the plurality of orthogonal subcarriers.

9. A method of receiving signals, the method comprising:
receiving, at a first reception antenna, signals transmitted using one or more first subcarriers only from a first transmission antenna, wherein the signals transmitted from the first transmission antenna comprise first signals based on data; and receiving, at the first reception antenna, signals transmitted using one or more second subcarriers different from the one or more first subcarriers only from a second transmission antenna, wherein the signals transmitted from the second transmission antenna comprise second signals based on the data;

receiving, at a second reception antenna, the first signals and the second signals;

processing the first signals received at the first reception antenna and the first signals received at the second reception antenna as a first single input, multiple output (SIMO) system; and processing the second signals received at the first reception antenna and the second signals received at the second reception antenna as a second SIMO system;

wherein the data comprises one or more data portions;

wherein receiving the signals transmitted from the first and second transmission antennas comprises, for each data portion, receiving at least one first symbol using a respective one of the one or more first subcarriers transmitted from the first transmission antenna, and receiving at least one second symbol transmitted using a respective one of the one or more second subcarriers from the second transmission antenna; and wherein the first symbol and the second symbol are identical.

10. The method of claim 9, wherein the method comprises receiving no signals transmitted from the first transmission antenna on the one or more second subcarriers.

11. The method of claim 9, wherein the method comprises receiving no signals transmitted from the second transmission antenna on the one or more first subcarriers.

12. The method of claim 9, wherein, for each data portion, the respective one of the one or more first subcarriers and the respective one of the one or more second subcarriers are non-adjacent.

13. The method of claim 9:
wherein the method comprises receiving signals transmitted from one or more further transmission antennas;
wherein, for each further transmission antenna, receiving signals transmitted from the further transmission antenna comprises receiving signals transmitted using respective one or more further subcarriers only from the further transmission antenna;
wherein the signals transmitted from the further transmission antenna comprise second signals based on the data; and
wherein the respective one or more further subcarriers are different from the one or more first subcarriers and the one or more second subcarriers.

14. The method of claim 9, wherein the data comprises a training field and a data field.

15. The method of claim 9, wherein the one or more first subcarriers comprise a first subset of a plurality of orthogonal subcarriers; and wherein the one or more second subcarriers comprise a second subset of the plurality of orthogonal subcarriers.

16. A non-transitory computer readable recording medium storing a computer program product for controlling a transmitter, the computer program product comprising program instructions which, when run on processing circuitry of the transmitter, causes the transmitter to:
forming the first signals by encoding portions of the data according to a first encoding scheme to form first encoded data, mapping the first encoded data to first symbols according to a first modulation scheme, and performing an inverse discrete Fourier transform and multiplication by a complex waveform on the first symbols to form the first signals;

forming the second signals by encoding portions of the data according to a second encoding scheme to form second encoded data, mapping the second encoded data to second symbols according to a second modulation scheme, and performing an inverse discrete Fourier transform and multiplication by a complex waveform on the second symbols to form the second signals;

transmit signals using one or more first subcarriers only from a first antenna, wherein the signals transmitted from the first antenna comprise first signals based on data; and transmit signals using one or more second subcarriers different from the one or more first subcarriers only from a second antenna, wherein the signals transmitted from the second antenna comprise second signals based on the data;

wherein the data comprises one or more data portions; and wherein transmitting the signals from the first and second antennas comprises, for each data portion, transmitting at least one first symbol using a respective one of the one or more first subcarriers from the first antenna, and transmitting at least one second symbol using a respective one of the one or more second subcarriers from the second antenna; and wherein the first symbol and the second symbol are identical.

17. A non-transitory computer readable recording medium storing a computer program product for controlling a receiver, the computer program product comprising program instructions which, when run on processing circuitry of the receiver, causes the receiver to:

receive, at a first reception antenna, signals transmitted using one or more first subcarriers only from a first transmission antenna, wherein the signals transmitted from the first transmission antenna comprise first signals based on data; and receive, at the first reception antenna, signals transmitted using one or more second subcarriers different from the one or more first subcarriers only from a second transmission antenna, wherein the signals transmitted from the second transmission antenna comprise second signals based on the data;

receive, at a second reception antenna, the first signals and the second signals;

process the first signals received at the first reception antenna and the first signals received at the second reception antenna as a first single input, multiple output (SIMO) system; and process the second signals received at the first reception antenna and the second signals received at the second reception antenna as a second SIMO system;

wherein the data comprises one or more data portions;

wherein receiving the signals transmitted from the first and second transmission antennas comprises, for each data portion, receiving at least one first symbol using a respective one of the one or more first subcarriers transmitted from the first transmission antenna, and receiving at least one second symbol transmitted using a respective one of the one or more second subcarriers from the second transmission antenna; and wherein the first symbol and the second symbol are identical.

18. An apparatus for transmitting signals, the apparatus comprising:

processing circuitry;

memory containing instructions executable by the processing circuitry whereby the apparatus is operative to:

form first signals based on data by encoding portions of the data according to a first encoding scheme to form first encoded data, map the first encoded data to first symbols according to a first modulation scheme, and perform an inverse discrete Fourier transform and multiplication by a complex waveform on the first symbols to form the first signals;

form second signals based on data by encoding portions of the data according to a second encoding scheme to form second encoded data, map the second encoded data to second symbols according to a second modulation scheme, and perform an inverse discrete Fourier transform and multiplication by a complex waveform on the second symbols to form the second signals;

transmit signals using one or more first subcarriers only from a first antenna, wherein the signals transmitted from the first antenna comprise first signals based on data; and transmit signals using one or more second subcarriers different from the one or more first subcarriers only from a second antenna, wherein the signals transmitted from the second antenna comprise second signals based on the data;

wherein the data comprises one or more data portions;

wherein the transmitting the signals from the first and second antennas comprises, for each data portion, transmitting at least one first symbol using a respective one of the one or more first subcarriers from the first antenna, and transmitting at least one second symbol using a respective one of the one or more second subcarriers from the second antenna; and wherein the first symbol and the second symbol are identical.

19. An apparatus for receiving signals, the apparatus comprising:

processing circuitry;

memory containing instructions executable by the processing circuitry whereby the apparatus is operative to:

receive, at a first reception antenna, signals transmitted using one or more first subcarriers only from a first transmission antenna, wherein the signals transmitted from the first transmission antenna comprise first signals based on data;

receive, at the first reception antenna, signals transmitted using one or more second subcarriers different from the one or more first subcarriers only from a second transmission antenna, wherein the signals transmitted from the second transmission antenna comprise second signals based on the data;

receive, at a second reception antenna, the first signals and the second signals;

process the first signals received at the first reception antenna and the first signals received at the second reception antenna as a first single input, multiple output (SIMO) system; and process the second signals received at the first reception antenna and the second signals received at the second reception antenna as a second SIMO system;

wherein the data comprises one or more data portions;

wherein receiving the signals transmitted from the first and second transmission antennas comprises, for each data portion, receiving at least one first symbol using a respective one of the one or more first subcarriers transmitted from the first transmission antenna, and receiving at least one second symbol transmitted using a respective one of the one or more second subcarriers from the second transmission antenna; and wherein the first symbol and the second symbol are identical.

* * * * *